Figure 1:
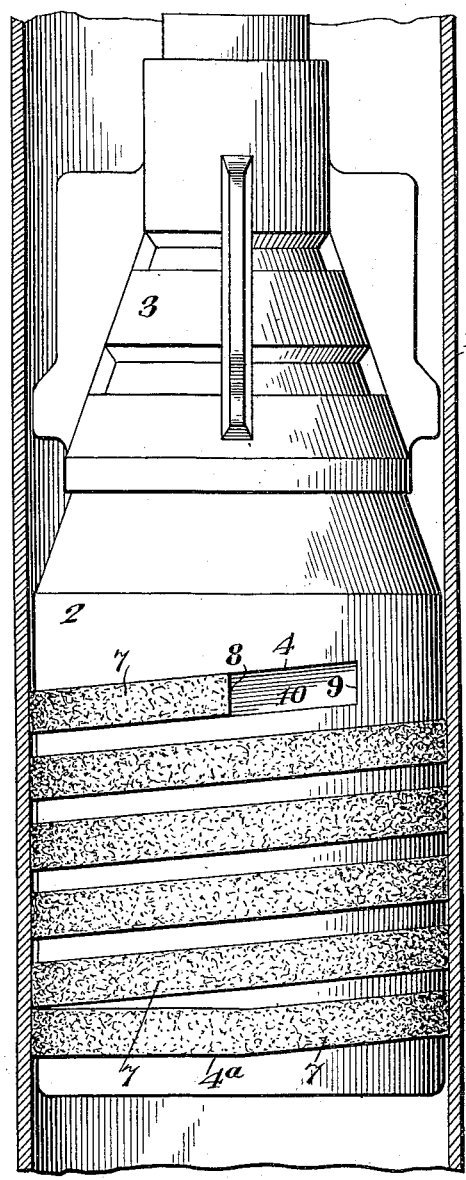

R. M. DOWNIE.
VALVE FOR DEEP WELL PUMPS.
APPLICATION FILED APR. 27, 1915.

1,161,851.

Patented Nov. 30, 1915.
2 SHEETS—SHEET 1.

WITNESSES:

Robert M. Downie, INVENTOR

BY

Attorney

R. M. DOWNIE.
VALVE FOR DEEP WELL PUMPS.
APPLICATION FILED APR. 27, 1915.

1,161,851.

Patented Nov. 30, 1915.
2 SHEETS—SHEET 2.

WITNESSES:

Robert M. Downie, INVENTOR

BY

Attorney

UNITED STATES PATENT OFFICE.

ROBERT M. DOWNIE, OF BEAVER FALLS, PENNSYLVANIA, ASSIGNOR TO KEYSTONE DRILLER COMPANY, OF BEAVER FALLS, PENNSYLVANIA, A CORPORATION OF PENNSYLVANIA.

VALVE FOR DEEP-WELL PUMPS.

1,161,851.  Specification of Letters Patent.  Patented Nov. 30, 1915.

Application filed April 27, 1915. Serial No. 24,308.

*To all whom it may concern:*

Be it known that I, ROBERT M. DOWNIE, a citizen of the United States, residing at Beaver Falls, in the county of Beaver and State of Pennsylvania, have invented a new and useful Valve for Deep-Well Pumps, of which the following is a specification.

This invention has reference to valves for deep well pumps, and its object is to provide a packing for such a valve whereby the water pumped automatically expands the packing and so prevents leakage and also tends to tighten the valve upon the pump rod.

In accordance with the present invention the valve body or piston where engaging the pump cylinder is provided with a spiral groove which may be of under-cut or dovetail form, and in this groove is seated a continuous strip of fibrous or other suitable packing. The groove or packing seat is somewhat longer than the strip of packing, so that there is left a space for the entrance of water in the upper end of the groove to abut against the packing and drive it lengthwise to cause it to expand into tight engagement with the walls of the cylinder, thereby not only keeping the packing in such engagement, but automatically taking up all wear.

With the present invention the degree of pressure of the packing against the walls of the cylinder is automatically adjusted by the pressure of the water being pumped, whereby there is a considerable saving in power, especially where the back pressure of the water is relatively small for the friction caused by the packing is then correspondingly less.

The spiral packing groove being of dovetail form prevents the packing from getting out of place when once inserted, nor can it turn over and wedge the piston, as is sometimes the case with cup packing. The packing of the present invention is also proof against gathering and holding sand and wedging, because of the presence of the sand, against the cylinder.

The sucker rods in deep well pumps are often hundreds of feet long and are made of sections screwed together at the ends. It sometimes happens that jars upon the valve or the pressure will have a tendency to loosen or unscrew the joints of the sucker rod.

With the spirally or helically arranged packing the pressure of the water above the valve acting on the upper end of the packing tends to rotate the valve always in one direction so that by arranging the packing and the screw threads of the sucker rod joints oppositely the sucker rod joints will always be maintained tight and all tendency to unscrew will thereby be wholly counteracted.

There are other advantageous features of the invention which will appear from a consideration of the detailed description to follow.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 2:
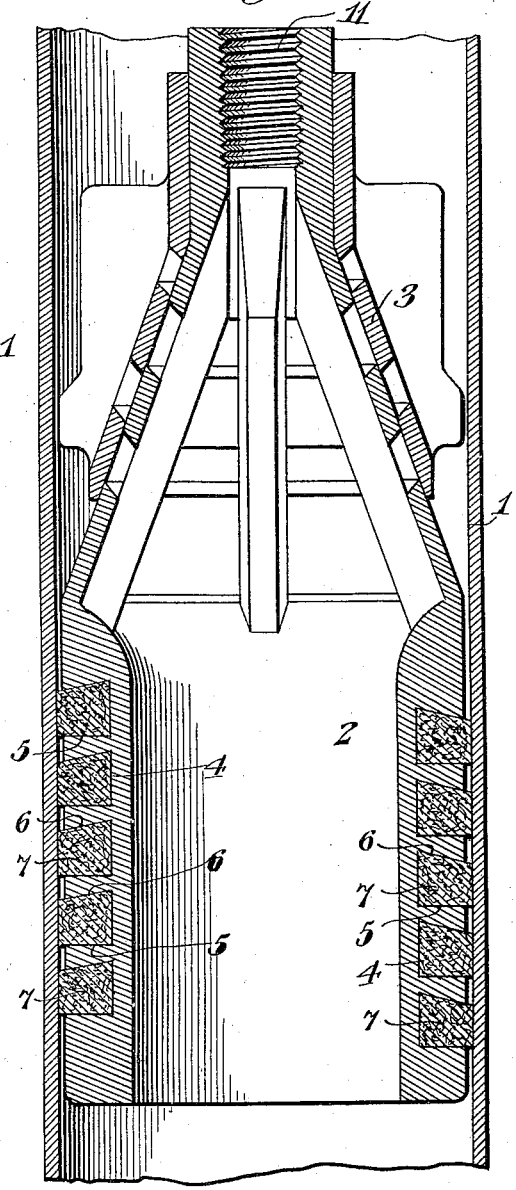
Figure 3:
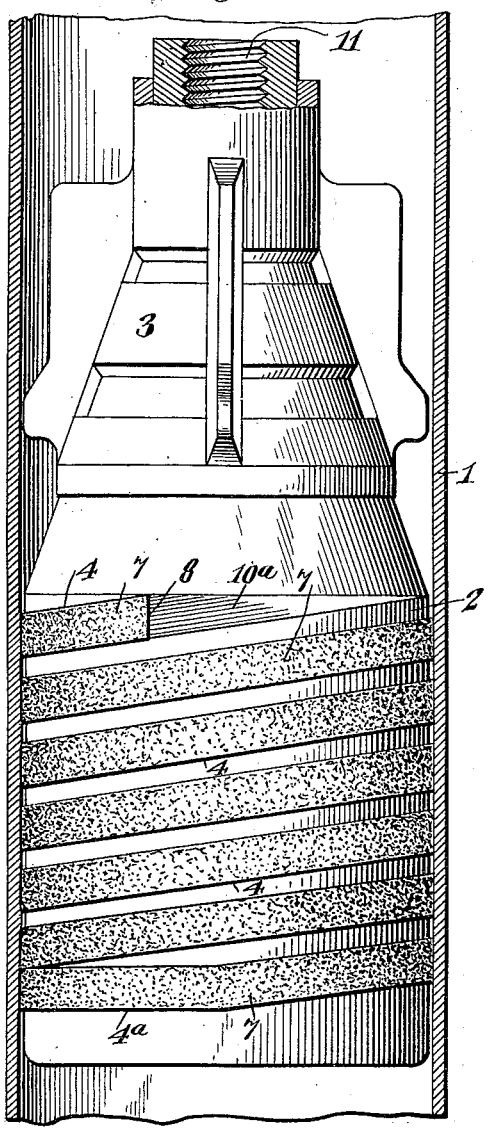
Figure 4:
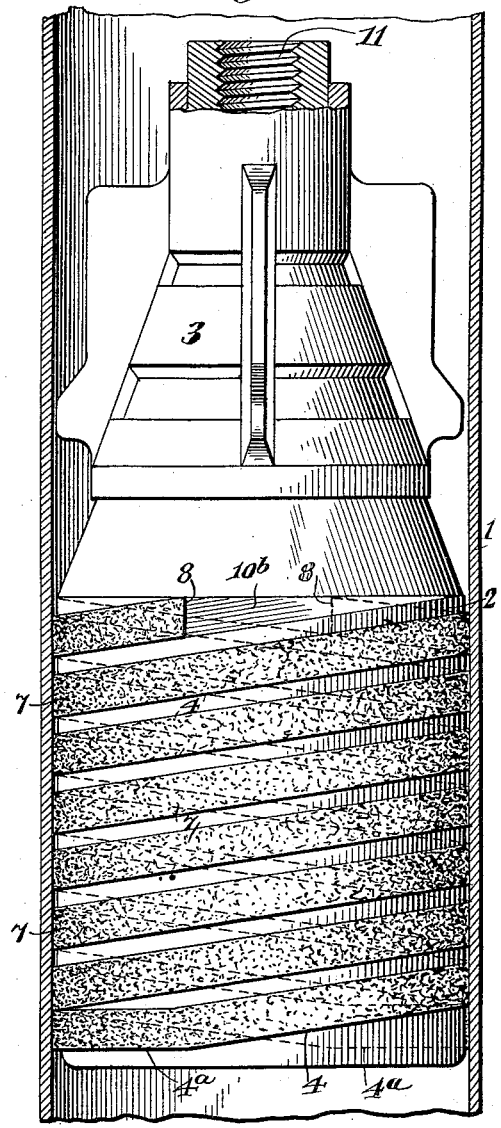

In the drawings: Figure 1 is an elevation of a valve with the improved packing, with the pump cylinder shown in cross-section. Fig. 2 is a vertical diametric cross-section of the structure of Fig. 1. Fig. 3 is an elevation similar to the showing of Fig. 1, but illustrating another arrangement of packing. Fig. 4 is a view similar to Figs. 1 and 3, but showing still another arrangement of the packing.

Referring to the drawings there is shown a pump cylinder 1 and a valve body 2 provided with a valve 3. So far as the valve itself is concerned, it does not in its structure enter into the present invention, and is shown and described in Patent No. 454,613, granted to R. M. and J. G. Downie, on June 23, 1891. The valve of said patent has the advantage of simplicity of construction and efficiency in operation, which operation is markedly improved by the application of the packing of the present invention. It will be understood, however, that the packing of the present invention is by no means confined to use with the particular valve or type of valve referred to, since it is susceptible of use with other forms of valves.

The valve body 2, which is exteriorly cylindrical in the showing of the drawing, has formed in its outer surface a helical groove 4 of undercut or dovetail cross-section. In the particular showing of the drawings the lower wall 5 of the groove, although helically progressive, is, at any chosen point, substantially level or radial to the longitudinal central axis of the pump cylinder, while the upper wall 6 is at an angle to such lower wall and so related thereto that the groove increases in height as it increases in depth, wherefore the outer end or mouth of the groove is of less height than the inner end or base of the groove. The groove 4 begins near the upper end of the cylinder 2 and following a helical course of rather short pitch terminates near the lower end of the body 2. Lodged in the groove 4 is a strip 7 of packing material. This strip may be, and is preferably a single length of packing, and while it may be of any suitable material, is preferably formed of fibrous material of a nature which will expand under pressure. The packing strip 7 is of less length than the groove 4 with the lower end of the packing strip abutting against the corresponding lower end of the groove 4, so that the upper end, indicated at 8, is spaced from the adjacent upper end 9 of the groove 4, thereby leaving a space 10 at the upper end of the groove.

With the valve of the present invention employed in a deep well pump there is considerable head of liquid above the valve. For convenience of description the fluid being pumped will be considered as water, although, of course, the valve might be useful with such materials as oil.

The water above the valve finds ready access to the chamber which is formed by the spacing of the end 8 of the packing from the upper end 9 of the groove 4, and this water exerts a considerable pressure on the end of the packing exposed to it, wherefore there is a tendency to force the packing lengthwise along the groove. This is resisted by the engagement of the lower end of the packing with the corresponding lower end of the groove 4 with the result that the packing is forced out against the inner wall of the cylinder 1 and engages this casing with a force corresponding to the weight of the water above the valve. The packing, therefore, presses more firmly against the cylinder when the water is being pumped to a relatively great height than when it is pumped to a less height. This automatically adjusts the packing to the conditions to be met, so that in a relatively shallow well the packing is pressed against the pump cylinder with less force than in a relatively deep well. In either case the tendency to leak past the packing is resisted by forces which automatically adjust the packing to meet the pressure conditions to which it is subjected.

A packing strip such as shown in the drawings is not liable to gather sand and cannot pull out of its seat to cause clogging and interference with the operation of the piston, conditions which may occur with cup-leather packing.

The undercut or dovetail form of the groove is advantageous in the case of rubber packing, since the latter is thereby prevented from projecting too far. Furthermore, should the packing project too far from the groove as when withdrawing the valve from the well, it can be drawn back into the groove by the simple expedient of twisting the sucker rod which would then have the effect of twisting or coiling the rubber packing into the bottom of the groove.

Instead of stopping the packing short of the upper end of the groove or channel 4, such groove may be continued to the upper end of the cylindrical body 2 of the valve and vanish into the conical portion carrying the valve 3, as shown at $10^a$ in Fig. 3 and $10^b$ in Fig. 4. In each instance the packing strip 7 is continued to the upper end of the groove 4 where it is of full width and the water or other fluid finds ready access to the upper end 8 of the packing by way of the vanishing portion $10^a$ or $10^b$ of the groove 4.

To prevent slippage of water through the unpacked space between the turns of the packing 7, the lower end of the groove 4 has a continuation $4^a$ which instead of being in helical relation is in cylindrical relation to the cylindrical portion 2 of the valve body, and this continuation is of a length so that it ultimately reaches the lower edge of the next higher turn to there close the helical passage between the turns of the packing strip.

For some purposes a single helical groove 4 with packing 7 therein is sufficient, but for other purposes it is advisable to provide two or more interspersed parallel helical grooves, as in the showing of Fig. 4, where two such parallel helical grooves 4 are indicated, and this showing may be taken as indicative of more than two helical grooves so arranged. Otherwise, the showing of Fig. 4 corresponds to the showing of Fig. 3, and the same arrangement might be provided with respect to the showing of Fig. 1.

In the valve hereinbefore described the packing used practically forms an abutment at the end 8 against which the pressure of the water above the valve is exerted. This pressure has a tendency to twist the valve so that by making the screw joints of the rod sections to unscrew in the contrary direction to the tendency of movement of the valve, the unscrewing of the valve rod sections is counteracted by the turning tendency of the valve itelf. In Figs. 2, 3 and 4 there is shown a screw socket 11 for the reception of the corresponding end of the sucker rod, which latter, however, is not shown. The threading of the socket 11 is pitched contrariwise to the direction of pitch of the packing so that any turning force exerted by the water upon the valve because of the packing only tends to screw the sucker rod tighter. It will be understood that all the sucker rod connections have the threads pitched the same as the socket 11. Of course, it does not make any difference which direction the threads connecting the sucker rod sections or the sucker rod to the valve are pitched so long as the turning tendency upon the valve itself is contrary to the unscrewing movement of the joints. The result in either case is that the sucker rod joints are automatically maintained tight under all conditions of use and accidental separation of the sucker rod or rods cannot occur.

What is claimed is:—

1. A deep well pump valve provided with a piston-like body helically grooved on its exterior, and packing lodged in the grooved portion with the upper end of the packing accessible to the fluid being pumped for the expansion of the packing by the pressure exerted lengthwise thereon.

2. A deep well pump valve provided with a cylindrical body helically grooved on its exterior with the turns of the helix of short pitch, and strip packing lodged in the helically grooved portion with the upper end portion of the packing accessible to the fluid being pumped for the expansion of the packing by the exertion of pressure thereon lengthwise thereof.

3. A valve structure for deep well pumps provided with a body portion helically grooved lengthwise of the valve structure with the turns of the helically grooved portion of undercut cross-section, and strip packing material lodged in the undercut grooved portion, and the latter extending beyond the upper part of the strip packing to provide for the direct access of the fluid being pumped to said upper end portion of the packing to expand said packing by pressure exerted lengthwise thereof.

4. A valve structure for deep wells provided with a cylindrical body having a helical groove of short pitch extending lengthwise thereof and a packing strip of fibrous material lodged in the groove and stopping short of its upper end for direct access of the fluid being pumped to the upper end wall of the packing strip to exert a force thereon longitudinally of said packing strip to thereby cause the expansion of the packing strip.

5. A valve structure for deep wells provided with a cylindrical body portion having a helical groove of short pitch extending lengthwise thereof, and a packing strip of fibrous material lodged in the groove and stopping short of the upper end of said groove to present the end of the packing strip to the fluid being pumped for the exertion of a force by said fluid upon the packing strip lengthwise thereof.

6. A valve structure for deep wells provided with a cylindrical body portion having a helical groove of short pitch extending lengthwise thereof, and a packing strip of fibrous material lodged in the groove and stopping short of the upper end of said groove to present the end of the packing strip to the fluid being pumped for the exertion of a force by said fluid upon the packing strip lengthwise thereof, the groove being of undercut or dovetail cross-section and the packing strip conforming thereto.

7. A pump valve or piston provided with a cylindrical body with an exterior inclined groove therein and packing located in said groove with one end of said packing within the groove accessible to the liquid being pumped for the exertion of pressure thereby on the end of said packing.

8. A pump valve or piston having a cylindrical body with a helical groove on its exterior surface having its lowermost turn closing on to itself, and a packing strip lodged in the groove with its lowermost turn closed on itself, and the uppermost turn stopping short of the upper extremity of the groove to provide for access of the fluid being pumped to the upper end of the packing strip for the expansion of said packing strip by pressure exerted lengthwise thereof by the fluid being pumped.

9. A pump valve or piston provided with a cylindrical body with one or more exterior inclined grooves therein and packings located in said grooves with the upper ends of said packings within the grooves accessible to the liquid being pumped for the exertion of pressure thereby on the end of said packings.

10. A pump valve or piston provided with a cylindrical body with one or more exterior grooves therein inclined contrariwise to the direction of pitch of the threads of the connections for the sucker rod, and packings located in said grooves, with the upper ends of said packings within the grooves accessible to the liquid being pumped, whereby the pressure exerted on the upper end of said packing will automatically tighten the threads of the sucker rod by which the valve is operated.

11. A pump valve or piston provided with a cylindrical body having one or more exterior helical grooves therein, and packings located in said grooves, with the upper ends of said packings within the grooves accessible to the liquid being pumped, the helical grooves in said valve being inclined oppositely to the inclination of the threads by which the valve is attached to the sucker rod, whereby the sucker rod connection with the valve is automatically maintained in a tight condition.

In testimony, that I claim the foregoing as my own, I have hereto affixed my signature in the presence of two witnesses.

ROBERT M. DOWNIE.

Witnesses:
JAS. M. STERRETT,
EARL McLANE.

It is hereby certified that in Letters Patent No. 1,161,851, granted November 30, 1915, upon the application of Robert M. Downie, of Beaver Falls, Pennsylvania, for an improvement in "Valves for Deep-Well Pumps," errors appear in the printed specification requiring correction as follows: Page 1, in heading to the printed specification strike out line 6 and insert *Continuation of application filed February 27, 1915, Serial No. 11,013. This application filed April 27, 1915. Serial No. 24,308.;* page 3, after line 21, insert the paragraph:

*This application is a continuation of application Serial No. 11,013, for valve for deep-well pumps, filed by me on February 27, 1915.* and that the said Letters Patent should be read with these corrections therein that the same may conform to the record of the case in the Patent Office.

Signed and sealed this 11th day of January, A. D., 1916.

[SEAL.]

J. T. NEWTON,
*Acting Commissioner of Patents.*

Cl. 103—63.